United States Patent Office 3,496,274
Patented Feb. 17, 1970

3,496,274
SYNERGISTIC FUNGICIDAL MIXTURE
Günther Mohr, Darmstadt, Konrad Niethammer, Traisa, and Sigmund Lust and Gerhart Schneider, Darmstadt, Germany, assignors to E. Merck A.G., Darmstadt, Germany
No Drawing. Continuation-in-part of application Ser. No. 568,137, July 27, 1966. This application Nov. 2, 1967, Ser. No. 679,988
Claims priority, application Germany, Apr. 2, 1963, M 56,343; Dec. 22, 1966, M 72,138
Int. Cl. A01n 9/22, 17/00
U.S. Cl. 424—263                    11 Claims

ABSTRACT OF THE DISCLOSURE

A synergistic fungicidal composition containing 5–95% of N - trichloromethylthio - tetrahydrophthalimide, N - trichloromethylthio-phthalimide or N-(1,1,2,2-tetrachloroethylthio)-tetrahydrophthalimide, and 95–5% of 2,6-dichloro-3,5-dicyano-4-phenyl-pyridine, the latter compound being optionally nitro-substituted in the phenyl ring.

---

This application is a continuation-in-part of copending divisional application Ser. No. 568,137, filed July 27, 1966, the latter being based on parent application Ser. No. 355,929 of Mar. 30, 1964, now United States Patent No. 3,284,293, issued Nov. 8, 1966.

This invention relates to a synergistic fungicidal mixture having a wide spectrum of activity.

An object of this invention, therefore, is to provide fungicidal mixtures and methods of using same.

Upon further study of the specification and claims, other objects and advantages of the present invention will become apparent.

To attain these objects, it has been discovered that highly effective fungicidal agents are obtained by mixing N-trichloromethylthio-tetrahydrophthalimide, N-trichloromethylthio - phthalimide or N-(1,1,2,2-tetrachloroethylthio)-tetrahydrophthalimide with a 2,6-dichloro-3,5-dicyano-4-phenyl-pyridine, optionally nitro-substituted in the phenyl ring. The thus-produced mixture is fungicidally effective to a greater extent than would be actually expected from the effect of the components individually, and is likewise more effective than the same amount of the individual components.

The proportions of the synergistic mixture are 5–95% of N - trichloromethylthio - tetrahydrophthalimide, N - trichloromethylthio-phthalimide or N-(1,1,2,2-tetrachloroethylthio)-tetrahydrophthalimide, and 95–5% of a 2,6-dichloro-3,5-dicyano-4-phenyl-pyridine optionally nitro-substituted in the phenyl group, the percentages being by weight, based on the total weight of the active components of the mixture. The preferred fungicidal mixtures of this invention contain the unsubstituted 2,6-dichloro-3,5-dicyano-4-phenyl-pyridine.

The synergistic effect of the fungicidal mixtures can be demonstrated, for example, in the spore germination test with the causative organism of apple scab. *Venturia unaequalis*. In this connection, a determination is made of the amounts of effective agents necessary to inhibit the germination of conidia of the above-mentioned fungus to the extent of 95%. The dosage is recorded in $\gamma$ ($10^{-6}$ g.) of effective agent or effective agent mixture per 100 cm.$^2$ of test area. The compounds are each dissolved in acetone and applied to inert substrates. After the solvent has been evaporated, spore slurries are applied to the dried coatings for germination. Averaged over 10 experiments, the lethal dosage of 95% ($LD_{95}$) was, for example:

N-trichloromethylthio-tetrahydrophthalimide (A) __ 24$\gamma$
2,6-dichloro-3,5-dicyano-4-phenyl-pyridine (B) ____ 15$\gamma$
Mixture of 35% A+65% B _____ 12$\gamma$
Mixture of 80% A+20% B _____ 11$\gamma$ Similar results are obtained when using N-trichloromethylthio - phthalimide or N - (1,1,2,2 - tetrachloroethylthio)-tetrahydrophthalimide instead of A.

In addition to exhibiting this unexpected synergistic effect, the mixtures of the present invention also exhibit a substantially prolonged duration of effectiveness, an important advantage for agronomy.

Especially good results are obtained when mixing the 2,6-dichloro-3,5-dicyano-4-phenyl-pyridines with the N-substituted phthalimides or tetrayhydropthalimides, respectively, in a weight ratio of 20:80 to 65:35. In field tests, 40% formulations of the synergistic mixtures have proven to be particularly advantageous, containing about 15% N - trichloromethylthio - tetrahydrophthalimide (A) and about 25% 2,6-dichloro-3,5-dicyano-4-phenyl-pyridine (B). Likewise, a corresponding formulation containing 30% A and 10% B has been found especially useful in practice.

The N-substituted phthalimides and tetrahydrophthalimides, respectively, mentioned above are known fungicides. The preparation of N-trichloromethylthio-phthalimide and of the corresponding tetrahydrophthalimide is described in detail, for example, in German Patent No. 887,506. As regards N-(1,1,2,2-tetrachloroethylthio)-tetrahydro-phthalimide, details are to be found in Belgian Patent No. 633,205. Disclosure of the production of the substituted 4-phenyl-pyridines can be found in United States Patent No. 3,284,293 wherein there are described, in addition to 2,6-dichloro-3,5-dicyano-4-phenyl-pyridine, also 2,6-dichloro-3,5-dicyano-4-(p-nitrophenyl) - pyridine and 2,6-dichloro-3,5-dicyano-4-(m-nitrophenyl) - pyridine as effective substances.

The novel fungicidal agents of this invention can be incorporated in all customary forms of application. Thus, with the addition of the conventional carriers and/or fillers, it is possible, for example, to manufacture spraying or dusting compositions which can optionally contain further additives, such as dispersing or wetting agents, etc. With the use of appropriate additives, the agents can also be made into solutions or emulsions which can be atomized, for example, in accordance with the aerosol process. Particularly suitable solvents for this purpose are hydrocarbons, such as gasoline, petroleum, benzene, toluene, xylenes, tetrahydronaphthalene, decahydronaphthalene, or mixtures thereof. All forms of application generally contain 1–95% of active agent.

The novel fungicides are to be employed in the plant growing art. They are particularly valuable owing to their wide-spectrum and prolonged duration of effectiveness. In general, the synergistic mixtures usually sold as formulations containing 30–50% of the active ingredients, are applied to the locus-to-be-treated in a concentration of 0.03 to 2.0% (calculated on the total amount of active ingredients). Normally, satisfying results are obtained by applying the compositions according to the present invention in a concentration of 0.1 to 0.2%. The quantity to be applied per hectare is about 1 to 50 kg., preferably about 2.5 to 25 kg. The quantity largely depends on the manner of application. For example, for spraying fields of trees a quantity of up to 5000 l./ha. of the diluted formulation may be necessary whereas for normal field spraying up to 600 l./ha. are generally sufficient. Application from aircrafts, on the other hand, is usually done with quantities ranging about 50 l./ha.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. The amounts set forth in the examples are percent by weight.

EXAMPLE 1

| Sprayable powder: | Percent |
|---|---|
| N-trichloromethylthio-tetrahydrophthalimide | 25 |
| 2,6-dichloro-3,5-dicyano-4-phenyl-pyridine | 15 |
| Sulfite powder | 15 |
| Dialkyl naphthalene sulfonate | 0.5 |
| Bole | 44.5 | are gound intimately together. The thus-prepared powder can be sprayed or atomized in the form of a dilute aqueous suspension.

EXAMPLE 2

| Sprayable powder: | Percent |
|---|---|
| N-trichloromethylthio-tetrahydrophthalimide | 30 |
| 2,6-dichloro-3,5-dicyano-4-phenyl-pyridine | 10 |
| N-methyl-oleic acid tauride | 8 |
| Bole | 52 | are ground to the required degree of fineness. By dilution with water, there is obtained a finely dispersed emulsion suitable for spraying or atomizing.

EXAMPLE 3

| Adhering dust: | Percent |
|---|---|
| N-trichloromethylthio-tetrahydrophthalimide | 5 |
| 2,6-dichloro-3,5-dicyano-4-phenyl-pyridine | 1 |
| Silicic acid | 3 |
| Magnesium chloride | 5 |
| Carboxymethyl cellulose | 1 |
| Talc | 85 | are well mixed with one another, or ground up together, and applied by dusting.

EXAMPLE 4

| Dispersion concentrate: | Percent |
|---|---|
| N-trichloromethylthio-tetrahydrophthalimide | 30 |
| 2,6-dichloro-3,5-dicyano-4-phenyl-pyridine | 10 |
| Nonyl phenol polyglycol ether | 3 |
| Carboxymethyl cellulose | 2 |
| Silicic acid | 1 |
| Demineralized water | 54 | are mixed with one another. Before use, the concentrate is diluted with water. The thus-obtained mixture can be sprayed or atomized.

EXAMPLE 5

| Sprayable powder: | Percent |
|---|---|
| N-trichloromethythlio-tetrahydrophthalimide | 25 |
| 2,6-dichloro-3,5-dicyano-4-(p-nitrophenyl)-pyridine | 15 |
| Sulfite powder | 15 |
| Dialkyl naphthalene sulfonate | 0.5 |
| Bole | 44.5 | are intimately ground together. The thus-prepared powder can be sprayed or atomized in the form of a dilute aqueous suspension.

EXAMPLE 6

| Sprayable powder: | Percent |
|---|---|
| N-trichloromethylthio-phthalimide | 30 |
| 2,6-dichloro-3,5-dicyano-4-phenyl-pyridine | 10 |
| Sulfite powder | 18 |
| Dialkyl naphthalene sulfonate | 0.5 |
| Bole | 41.5 | are ground together. Before application, the powder is diluted with water to form a 0.1% sprayable liquid.

EXAMPLE 7

| Sprayable powder: | Percent |
|---|---|
| N-trichloromethylthio-phthalimide | 30 |
| 2,6-dichloro-3,5-dicyano-4-phenyl-pyridine | 10 |
| N-methyl oleic acid tauride | 7.5 |
| Bole | 52.5 | are ground together to form a fine powder. By diluting it with water an emulsion is obtained which is suitable for spraying or atomizing.

EXAMPLE 8

| Sprayable powder: | Percent |
|---|---|
| N - (1,1,2,2 - tetrachloroethylthio)-tetrahydrophthalimide | 25 |
| 2,6-dichloro-3,5-dicyano-4-phenyl-pyridine | 15 |
| Sulfite powder | 18 |
| Dialkyl naphthalene sulfonate | 0.5 |
| Bole | 41.5 | are ground together. For application, the powder is diluted with water to the desired concentration (0.1 or 0.2%) thus yielding a sprayable liquid ready-for-use.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:
1. A fungicidal composition comprising a fungicidally effective amount of a synergistic mixture of:
   (A) 5–95% by weight of a member selected from the group consisting of N-trichloromethylthio-tetrahydrophthalimide, N - trichloromethylthio-phthalimide an N - (1,1,2,2 - tetrachloroethylthio) - tetrahydrophthalimide, and
   (B) 95–5% by weight of a member selected from the group consisting of 2,6-dichloro-3,5-dicyano-4-phenylpyridine, 2,6-dichloro - 3,5 - dicyano-4-(m-nitrophenyl)-pyridine, and 2,6-dicholor-3,5-dicyano-4-(p-nitrophenyl)-pyridine.

2. A composition as defined by claim 1 wherein said member is 2,6-dichloro-3,5-dicyano-4-phenyl-pyridine.

3. A composition as defined by claim 1 wherein the percentage weight ratio of (A) to (B) is 80:20 to 35:65.

4. A composition as defined by claim 2 wherein the percentage weight ratio of (A) to (B) is 80:20 to 35:65.

5. A composition as defined by claim 1 wherein said mixture comprises about 40% by weight of said composition, said 40% consisting of 15% N-trichloromethylthio-tetrahydrophthalimide and 25% of 2,6-dichlooro-3,5-dicyano-4-phenyl-pyridine.

6. A composition as defined by claim 1 wherein said mixture comprises about 40% by weight of said composition said 40% consisting of 30% N-trichloromethylthio-tetrahydrophthalimide and 10% of 2,6-dichloro-3,5-dicyano-4-phenyl-pyridine.

7. In a process for obtaining a definite inhibiting effect on fungi and for preventing fungus spores from germinating, which comprises the step of contacting said fungi with a 2,6-dichloro-3,5-dicyano-4-phenyl-pyridine fungicide composition, the improvement which consists of effecting said step with a composition as defined by claim 1 at a rate of 1–50 kg./ha. in order to thereby obtain a fungicidal effectiveness to a greater extent than that obtainable from the effect of the components individually and more effective than the same amount of the individual components.

8. In a process for obtaining a definite inhibiting effect on fungi and for preventing fungus spores from germinating, which comprises the step of contacting said fungi with a 2,6-dichloro-3,5-dicyano-4-phenyl-pyridine fungicide composition, the improvement which consists of effecting said step with a composition as defined by claim 2 at a rate of 1–50 kg./ha. in order to thereby obtain a fungicidal effectiveness to a greater extent than that obtainable from the effect of the components individually and more effective than the same amount of the individual components.

9. In a process for obtaining a definite inhibiting effect on fungi and for preventing fungus spores from germinating, which comprises the step of contacting said fungi with a 2,6-dichloro-3,5-dicyano-4-phenyl-pyridine fungicide composition, the improvement which consists of effecting said step with a composition as defined by claim 3 at a rate of 1–50 kg./ha. in order to thereby obtain a fungicidal effectiveness to a greater extent than that obtainable from the effect of the components individually and more effective than the same amount of the individual components.

10. In a process for obtaining a definite inhibiting effect on fungi and for preventing fungus spores from germinating, which comprises the step of contacting said fungi with a 2,6-dichloro-3,5-dicyano-4-phenyl-pyridine fungicide composition, the improvement which consists of effecting said step with a composition as defined by claim 4 at a rate of 1–50 kg./ha. in order to thereby obtain a fungicidal effectiveness to a greater extent than that obtainable from the effect of the components individually and more effective than the same amount of the individual components.

11. In a process for obtaining a definite inhibiting effect on fungi and for preventing fungus spores from germinating, which comprises the step of contacting said fungi with a 2,6-dichloro-3,5-dicyano-4-phenyl-pyridine fungicide composition, the improvement which consists of effecting said step with a composition as defined by claim 5 at a rate of 1–50 kg./ha. in order to thereby obtain a fungicidal effectiveness to a greater extent than that obtainable from the effect of the components individually and more effective than the same amount of the individual components.

References Cited

UNITED STATES PATENTS 3,284,293  11/1966  Mohr et al. _____ 424—263

FOREIGN PATENTS 887,506  7/1953  Germany.
6,332,205  12/1963  Belgium.

S. K. ROSE, Primary Examiner

U.S. Cl. X.R.

424—274